United States Patent
Keuter et al.

(10) Patent No.: US 12,298,246 B2
(45) Date of Patent: May 13, 2025

(54) METHOD FOR DETERMINING AND OPTIMIZING THE CONTENT OF AT LEAST ONE PLANT SUBSTANCE OF AT LEAST ONE PART OF A PLANT

(71) Applicant: Fraunhofer-Gesellschaft zur Förderung der angewandten Forschung e.V., Munich (DE)

(72) Inventors: Volkmar Keuter, Essen (DE); Dennis Schlehuber, Oberhausen (DE); Annette Somborn, Recklinghausen (DE); Holger Wack, Dortmund (DE); Stephan Deckert, Dinslaken (DE); Victor Takazi Katayama, Duisburg (DE); Felix Thoma, Dusseldorf (DE)

(73) Assignee: Fraunhofer-Gesellschaft zur Förderung der angewandten Forschung e. V., Munich (DE)

(*) Notice: Subject to any disclaimer, the term of this patent is extended or adjusted under 35 U.S.C. 154(b) by 248 days.

(21) Appl. No.: 17/778,532

(22) PCT Filed: Nov. 20, 2020

(86) PCT No.: PCT/EP2020/082929
§ 371 (c)(1),
(2) Date: May 20, 2022

(87) PCT Pub. No.: WO2021/099588
PCT Pub. Date: May 27, 2021

(65) Prior Publication Data
US 2023/0044049 A1     Feb. 9, 2023

(30) Foreign Application Priority Data
Nov. 22, 2019 (DE) .................. 10 2019 131 650.2

(51) Int. Cl.
*G01N 21/64* (2006.01)
*G01N 21/63* (2006.01)

(52) U.S. Cl.
CPC ... *G01N 21/6486* (2013.01); *G01N 2021/635* (2013.01); *G01N 2201/0627* (2013.01)

(58) Field of Classification Search
CPC ......... G01N 21/6486; G01N 2021/635; G01N 2201/0627
See application file for complete search history.

(56) References Cited

U.S. PATENT DOCUMENTS

| 4,500,641 A | * | 2/1985 | van den Engh | ....... G01N 15/14 356/342 |
| 4,650,336 A | | 3/1987 | Moll | |

(Continued)

FOREIGN PATENT DOCUMENTS

| DE | 69706162 T2 | 4/2002 |
| DE | 69805862 T2 | 1/2003 |

(Continued)

*Primary Examiner* — Blake C Riddick
(74) *Attorney, Agent, or Firm* — The Webb Law Firm

(57) ABSTRACT

Described and represented is a method for determining the content of at least one plant substance of at least one part of a plant. In order for the content of plant substances, in particular secondary plant substances, of at least one part of a plant to be determined and optimized more expediently, it is provided that the at least one part of the plant is irradiated successively with light of different wavelengths and/or wavelength ranges and that, in response to the irradiation of the at least one part of the plant with light of each wavelength and/or at each wavelength range, the chlorophyll fluorescence of at least substantially the same wavelength and/or at least substantially the same wavelength range is measured in each case.

15 Claims, 7 Drawing Sheets

(56) References Cited

U.S. PATENT DOCUMENTS

| | | | |
|---|---|---|---|
| 5,389,781 A | 2/1995 | Beck et al. | |
| 5,412,219 A * | 5/1995 | Chappelle | G01N 21/64 250/461.1 |
| 5,717,210 A | 2/1998 | Bexelius et al. | |
| 5,822,068 A * | 10/1998 | Beaudry | G01N 21/64 356/417 |
| 6,100,093 A | 8/2000 | Van Kooten et al. | |
| 6,563,122 B1 | 5/2003 | Ludeker et al. | |
| 7,547,508 B1 * | 6/2009 | Lefcourt | G01N 21/94 435/29 |
| 8,476,603 B2 | 7/2013 | Moise et al. | |
| 8,850,742 B2 * | 10/2014 | Dube | G01N 21/6486 47/60 |
| 10,024,832 B2 | 7/2018 | Imanishi et al. | |
| 2001/0030742 A1 * | 10/2001 | Kramer | G01N 21/255 356/417 |
| 2005/0072935 A1 * | 4/2005 | Lussier | G01N 21/6486 250/458.1 |
| 2005/0098713 A1 * | 5/2005 | Holland | G01N 21/64 250/221 |
| 2006/0102851 A1 * | 5/2006 | Jalink | G01N 21/6456 250/461.2 |
| 2008/0101657 A1 * | 5/2008 | Durkin | G01N 21/4795 382/110 |
| 2010/0049058 A1 * | 2/2010 | Ishihara | A61B 1/043 600/477 |
| 2010/0111369 A1 * | 5/2010 | Lussier | G01N 21/6486 356/417 |
| 2010/0115830 A1 * | 5/2010 | Dube | G01N 21/6486 356/402 |
| 2010/0181496 A1 * | 7/2010 | Moise | G01N 21/645 250/221 |
| 2010/0279332 A1 * | 11/2010 | Cerovic | G01N 21/3151 435/29 |
| 2011/0101239 A1 | 5/2011 | Woodhouse et al. | |
| 2012/0018356 A1 * | 1/2012 | Jalink | G01N 21/6456 209/576 |
| 2012/0310540 A1 * | 12/2012 | McDermitt | A01G 7/02 702/19 |
| 2013/0276368 A1 * | 10/2013 | Takayama | A01G 7/00 382/110 |
| 2014/0085686 A1 * | 3/2014 | Ishihara | H04N 1/02815 358/475 |
| 2014/0168412 A1 * | 6/2014 | Shulman | G06V 20/20 348/89 |
| 2014/0343863 A1 * | 11/2014 | Imanishi | G01N 21/6408 702/19 |
| 2014/0378513 A1 * | 12/2014 | McBride | A01N 43/40 435/6.15 |
| 2015/0204787 A1 | 7/2015 | Kramer et al. | |
| 2016/0349180 A1 | 12/2016 | Tischler et al. | |
| 2018/0313760 A1 * | 11/2018 | Kramer | G01N 21/6486 |
| 2019/0059202 A1 | 2/2019 | Lorek | |
| 2019/0204228 A1 * | 7/2019 | Ogawa | G01N 21/648 |
| 2019/0259108 A1 * | 8/2019 | Bongartz | A01G 31/02 |
| 2020/0013166 A1 * | 1/2020 | Ogawa | G01N 21/27 |
| 2020/0184153 A1 * | 6/2020 | Bongartz | A01G 9/24 |
| 2020/0258265 A1 * | 8/2020 | Takashima | G06T 11/00 |
| 2021/0228757 A1 * | 7/2021 | Vasefi | G01N 21/6456 |
| 2022/0061227 A1 * | 3/2022 | Naich | F21V 29/70 |
| 2022/0087111 A1 * | 3/2022 | Li | A01G 7/045 |
| 2022/0196556 A1 * | 6/2022 | Liran | G01N 21/6486 |

FOREIGN PATENT DOCUMENTS

| | | |
|---|---|---|
| DE | 60304338 T2 | 12/2006 |
| DE | 102014212657 A1 | 12/2015 |
| EP | 0215399 A2 | 3/1987 |
| WO | 9515488 A1 | 6/1995 |
| WO | 2004026022 A1 | 4/2004 |

* cited by examiner

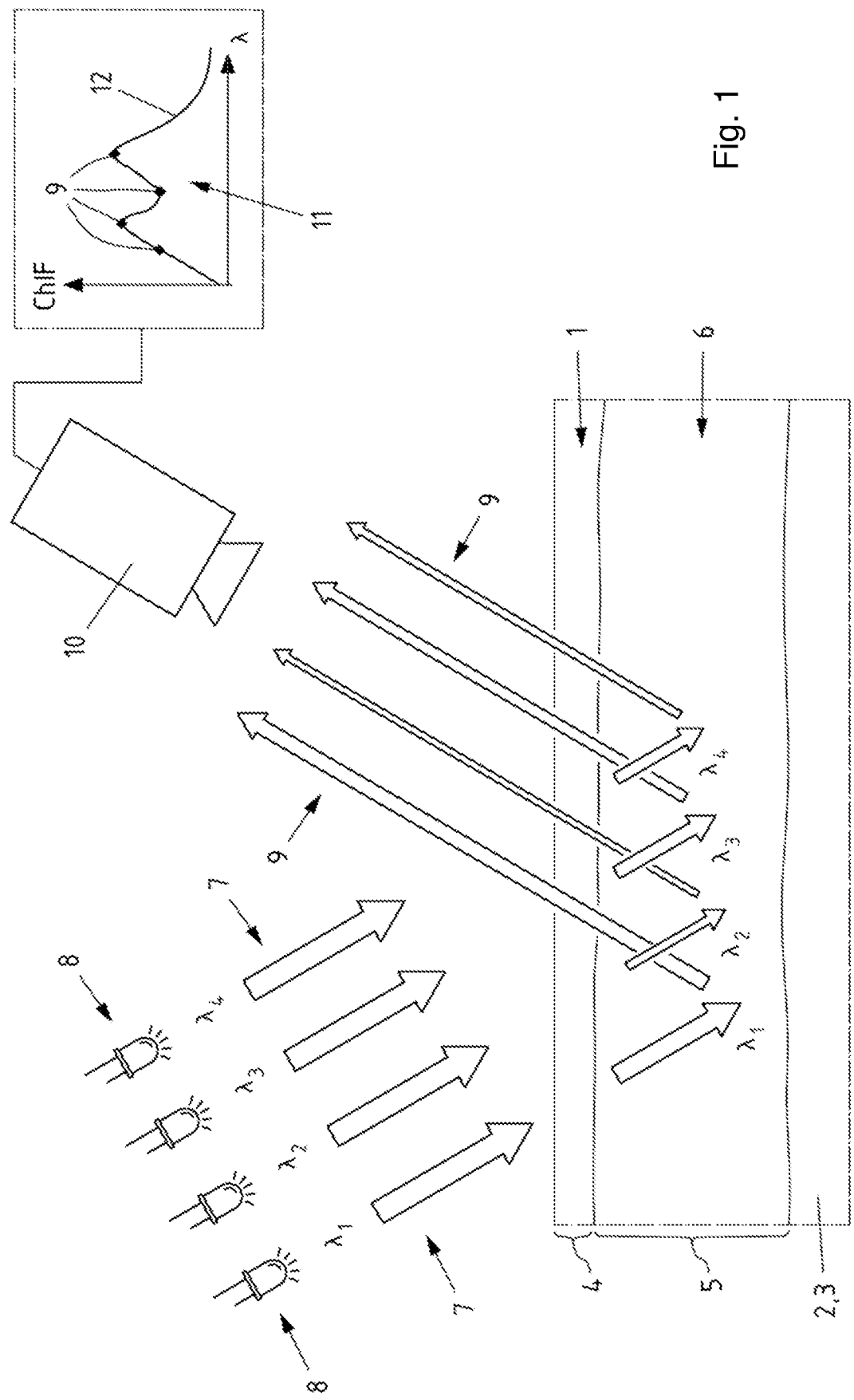

METHOD FOR DETERMINING AND OPTIMIZING THE CONTENT OF AT LEAST ONE PLANT SUBSTANCE OF AT LEAST ONE PART OF A PLANT

CROSS-REFERENCE TO RELATED APPLICATIONS

This application is the United States national phase of International Application No. PCT/EP2020/082929 filed Nov. 20, 2020, and claims priority to German Patent Application No. 10 2019 131 650.2 filed Nov. 22, 2019, the disclosures of which are hereby incorporated by reference in their entirety.

BACKGROUND OF THE INVENTION

Field of the Invention

The invention relates to a method for determining the content of at least one plant substance of at least one part of a plant. The invention further relates to a method for optimizing the content of at least one plant substance of at least one plant at the time of harvesting the at least one plant.

Description of Related Art

The agricultural production of plants focuses on two fundamental principles, one of which is usually the dominant principle. For example, for economic reasons, in many cases the aim is to produce plants that are as large as possible, which therefore achieves a high yield. In other cases, the size of the plants is less significant. In these cases, the constituents of the plants are more important. Such plants are, for example, herbs, spice plants, medical plants or medicinal plants. For these plants, the yield to be obtained depends on the content of certain plant substances. In most cases, the corresponding content of plant substances is determined after harvest by chemical or physical analysis methods. The corresponding contents are seasonally dependent and can only be recorded after harvesting such that there can be no or only very insufficient influence on the content of plant substances of the plants to be harvested.

Plant substances can be divided into primary plant substances and secondary plant substances. Primary plant substances include the substances essential for the growth of the plant, such as for example chlorophyll. There are different types of chlorophyll that can occur together in one plant. The secondary plant substances protect the plant against UV radiation, other weather influences and predators, for example. In addition, many secondary plant substances are considered beneficial to human health. These secondary plant substances are, to a particular degree, formed by the plant under stress. The stress of the plant can be caused, for example, by moisture, dryness, heat, cold, carbon dioxide content of the air, shift of the day-night cycle, unfavorable light conditions, UV radiation, contact with the plant or damage to the plant. However, the complicated mechanisms behind it are not yet sufficiently understood.

Secondary plant substances include, for example, alkaloids, amino acids, polyphenols, anthocyanins and flavonols. While the secondary plant substances are deposited in particular in the epidermis of the leaves, i.e. close to the surface of the leaf, chlorophyll occurs in the palisade tissue below the epidermis. Chlorophyll absorbs light energy, most of which is used for photosynthesis. A part of the light energy, which is not usable but still absorbed, is released again in the form of fluorescence, the so-called chlorophyll fluorescence (ChlF), in the range of the dark red color spectrum of the light.

Efforts have already been made to use this chlorophyll fluorescence to draw conclusions about the condition of the plants, such as the nitrogen content and the plants' ability to absorb radiation. However, it is not yet possible to draw satisfactory conclusions about the quality of living plants, let alone to adapt the growing conditions for the plants in such a way that a satisfactory quality of the plants could be ensured.

SUMMARY OF THE INVENTION

Therefore, the object underlying the invention is to design and further develop the methods of the type mentioned at the outset and previously described in more detail in such manner that the content of plant substances, in particular secondary plant substances, can be determined and optimized more expediently by at least one part of a plant.

This object is achieved as described herein by a method for determining the content of at least one plant substance of at least one part of a plant,
  in which the at least one part of the plant is successively irradiated with light of different wavelengths and/or wavelength ranges and
  in which, in response to the irradiation of the at least one part of the plant with light of each wavelength and/or at each wavelength range, the chlorophyll fluorescence of at least substantially the same wavelength and/or at least substantially the same wavelength range is measured in each case.

The mentioned object is further achieved as described herein by a method for optimizing the content of at least one plant substance of at least one plant at the time of harvesting the at least one plant,
  in which the content of the at least one plant substance of at least one part of the at least one plant is determined using a method as described herein.

The invention is based on the fact that light impinging upon a plant is absorbed to varying degrees by primary and secondary plant substances. The unabsorbed light is partially reflected by the plant (reflection) and partially passes through the plant (transmission), whereby the corresponding proportions can vary greatly from plant to plant and from wavelength to wavelength. Thus, many primary and secondary plant substances absorb light of different wavelengths to varying degrees. Some plant substances absorb light in a very narrow wavelength range and others in a wider wavelength range, wherein the proportion of absorbed radiation also varies within the respective wavelength range and has an absorption maximum or a plurality of local absorption maxima in this wavelength range. The proportion of absorbed radiation plotted over the wavelength produces a more or less characteristic curve for many plant substances. In the case of a plurality of absorption maxima over this curve, one of the absorption maxima is usually by far the largest in absolute terms. Due to the large number of plant substances present and their varying contents in the plant, it is not readily possible to draw conclusions about the content of a secondary plant substance from the reflected, absorbed and/or transmitted light of a certain wavelength.

The invention, however, takes into account that the chlorophyll fluorescence (ChlF) of a plant, in particular of a leaf, depends on how much light penetrates to the chlorophyll in the palisade tissue. The more light absorbed by secondary plant substances in the epidermis, the lower the proportion of this light is. Since this relationship occurs differently at different wavelengths, the at least one part of the at least one plant is irradiated with light of at least two different wavelengths and/or of at least two different wavelength ranges. In response to the irradiation at the first wavelength or the first wavelength range, the chlorophyll fluorescence is measured at a certain wavelength and/or in a certain wavelength range. The same is done in response to the irradiation with the second wavelength or the second wavelength range. If necessary, the same takes place in response to the irradiation with further wavelengths and/or wavelength ranges.

It is understood in this context that quite narrow wavelength ranges are preferred for the irradiation. If, on the other hand, the wavelength ranges are very wide, different interactions overlap even more. It is therefore particularly preferred if the light for irradiation of the at least one part of the leaf, i.e. the respective excitation radiation, is at least almost monochromatic. For practical reasons, it may be expedient to irradiate the at least one part of the at least one plant with light sources which radiate a certain wavelength range. LEDs are thus particularly suitable here, whose light is almost, but not necessarily exactly monochromatic, i.e. has only one wavelength. The wavelength ranges thereby preferably comprise wavelength intervals of less than 100 nm, preferably less than 50 nm, in particular less than 20 nm, further in particular less than 10 nm.

The measurement results of chlorophyll fluorescence obtained in this way can be used to draw conclusions about the content of at least one plant substance. For the sake of simplicity, the chlorophyll fluorescence can be recorded over the entire wavelength range of the chlorophyll fluorescence. However, it is also conceivable to record the chlorophyll fluorescence only in a certain wavelength range or only at a certain wavelength or at certain wavelengths, for example in order to enable a more accurate evaluation. If required, the spectrum of chlorophyll fluorescence can alternatively or additionally be recorded when recording the chlorophyll fluorescence, wherein it is conceivable that the wavelengths or the wavelength range, at which or in which the chlorophyll fluorescence takes place, are recorded. Alternatively or additionally, the chlorophyll fluorescence can be recorded as a function of the wavelength of the chlorophyll fluorescence spectrum, i.e. the distribution or "shape" of the chlorophyll fluorescence over the wavelength. In this case, the determination of the spectrum of chlorophyll fluorescence can also be limited to a wavelength range which is smaller than the entire wavelength range in which chlorophyll fluorescence occurs.

The recording of the spectrum of chlorophyll fluorescence can for example be recorded with a so-called hyperspectral camera. Such cameras record images from a large number of narrowly spaced wavelengths. As a result, hyperspectral data cubes can be formed as required, which have two spatial dimensions (directions in space) and one spectral dimension (direction in space). The hyperspectral data cubes then contain the information about the chlorophyll fluorescence, e.g. as a kind of response function, for the purpose of evaluation.

The spectrum of chlorophyll fluorescence depends on plant-specific factors and light effects, such as LHC (light harvesting complex) or NPQ (non-photochemical quenching). Instead of generating an integral over the spectrum of chlorophyll fluorescence and outputting the value of the integral as a grey-scale value, alternatively or additionally the spectrum of chlorophyll fluorescence as such can be used for the evaluation. For each excitation wavelength, a large number of chlorophyll fluorescence values for different wavelengths up to a continuous fluorescence spectrum can therefore be used, if required, as a basis for further evaluation.

In addition, it may in particular be advantageous if a wavelength or a wavelength range for the irradiation of the at least one part of the plant is close to the absolute absorption maximum of the at least one plant substance. In this case, the at least one plant substance absorbs a particularly large amount of light, and even more so the greater the content or the concentration of the at least one plant substance is in the leaf or in the epidermis of the leaf. If a further wavelength or a further wavelength range is selected such that at this wavelength or in this wavelength range no or only very low absorption of the light takes place by the at least one secondary plant substance, these measurement values of the chlorophyll fluorescence can be used particularly expediently for a comparison with the aim of deriving a statement about the content of the at least one plant substance. However, this may be adversely affected by the fact that at the last-mentioned wavelength or last-mentioned wavelength range, another secondary plant substance absorbs a large part of the light. Similarly, however, there may also be a restriction in determining the content of the at least one plant substance if a further secondary plant substance of varying content shows a distinct absorption ability at the first-mentioned wavelength or at the first-mentioned wavelength range. Then it may not be clear which plant substance is responsible for absorbing the corresponding wavelength or the corresponding wavelength range.

Furthermore, it must be taken into account as required that the chlorophyll fluorescence depends not only on the wavelength of the excitation radiation, but also on the intensity of the excitation radiation. In principle, the higher the radiation intensity at a certain wavelength, the greater the chlorophyll fluorescence. Thus, it may in principle be expedient to standardize the values of the chlorophyll fluorescence, for example to the radiation intensity of the excitation radiation and/or to define the radiation intensity for all or each of the excitation radiations. In this case, highly reproducible measurement results can be obtained.

The information obtained in the corresponding manner about the content of the at least one plant substance can also be used to optimize the content of the at least one plant substance. Experience from the past can be used here, as required, to determine which measures had a positive influence on the content of the at least one plant substance in which cases. In addition, the described method can be used to better identify and understand these relationships. For example, the growth conditions can be observed and/or changed over the growth of the plants and, at the same time, the effects on the content of the at least one plant substance can be determined with the corresponding method.

For the sake of clarity and to avoid unnecessary repetition, the two methods are described together below, without distinguishing in detail between the methods. However, the person skilled in the art can see from the context which features are particularly preferred for which method.

In a first particularly preferred configuration of the method for determining the content of at least one plant substance, the measured values of the chlorophyll fluorescence are compared with one another and/or with reference values in order to draw conclusions, for example on the basis of empirical values, about the content of the at least one plant substance. This comparison can thereby preferably be based on the values of the chlorophyll fluorescence as a function of the wavelengths and/or wavelength ranges used for the irradiation. The wavelengths and/or wavelength ranges can have a significant influence on the chlorophyll fluorescence. In other words, response signals in the form of chlorophyll fluorescence can be created for a certain wavelength as the response to the irradiations and compared. Alternatively or additionally, the response signals for a wavelength range of chlorophyll fluorescence can be compared. Additionally, the response signals for different wavelengths and/or wavelength ranges of the chlorophyll fluorescence can each be compared separately. In order to obtain a more reliable statement, the results of comparisons for different wavelengths and/or wavelength ranges can also be compared with each other.

In this way, a conclusion can be made about the content of at least one certain secondary plant substance. This can be done, for example, such that different plants or leaves are measured in the manner described and then a chemical or physical analysis of the plants or leaves is carried out using conventional methods. If required, a kind of library of reference values can be created with which real measurement results can later be compared and thereby evaluated. Alternatively or additionally, correlations can be determined, as required, using the described method and accompanying conventional analyses, which can later be used to determine the content of plant substances without supplementary conventional analysis.

Since different plant substances play a role in the light absorption of a plant, in particular of a leaf, which can, under certain circumstances, also vary greatly depending on the respective condition of the plant, it is particularly preferred to carry out the irradiation successively with more than two, if required, as many wavelengths as possible. In this way, the different interactions can be taken into account and, based on the supplementary information from the chlorophyll fluorescences, a conclusion can be reliably made about the content of the at least one plant substance. Consequently, the at least one part of the plant can be irradiated successively with light of at least three, preferably of at least four, in particular of at least five, different wavelengths and/or wavelength ranges, wherein, in response to the irradiation of the at least one part of the plant with light of the at least three, preferably of the at least four, in particular of the at least five, different wavelengths and/or wavelength ranges, the chlorophyll fluorescence of at least substantially the same wavelength and/or at least substantially the same wavelength range is measured in each case. It is understood that the irradiation can also take place with significantly more than five different wavelengths and/or wavelength ranges. With a sufficiently high number of wavelengths and/or wavelength ranges, an almost continuous course of the chlorophyll fluorescence can be generated, as required, over the wavelength, which can then be evaluated particularly precisely with mathematical methods known per se.

In order to be able to make more precise statements about the content of the at least one plant substance, it is generally advisable if at least one of the different wavelengths and/or wavelength ranges is at least substantially in the range of the absorption maximum of a plant substance. This applies in particular if the at least one absorption maximum of the at least one plant substance is selected from which the content is to be determined. In addition, it can be provided, in particular when using a plurality of wavelengths and/or wavelength ranges, that at least two, in particular at least three, of the different wavelengths and/or wavelength ranges are selected at least substantially in the range of the absorption maximum of at least two, in particular of at least three, plant substances. Here too, the absorption maxima can be selected at least in part from plant substances, of which the content is to be determined. It is further understood that analogously also four, five, six or more wavelengths and/or wavelength ranges can be selected.

Alternatively or additionally, at least one of the different wavelengths and/or wavelength ranges can be selected at least substantially in the range of the absorption maximum of a chlorophyll. In this way, the value of the chlorophyll fluorescence assigned to the absorption maximum of the at least one chlorophyll can be used as a reference value for determining the content of the at least one plant substance. It is also conceivable that the determined values of the chlorophyll fluorescence based on the chlorophyll fluorescence are standardized for the absorption maximum of chlorophyll.

If, from the measured values of the chlorophyll fluorescence, a response function is recorded as a function of the wavelengths and/or wavelength ranges used for the irradiation, this can be easily, reproducibly and quickly evaluated using mathematical methods known per se. If required, the response function can be evaluated by comparing it with reference response functions. The reference response functions can in particular be taken from a reference library for corresponding response functions to which determined contents of the at least one plant substance are assigned.

The content of the at least one plant substance thereby corresponds, for example, approximately to the content assigned to the reference response function, which corresponds best to the recorded response function. Alternatively or additionally, a curve fitting can be carried out on the basis of the wavelength-dependent response function, which is also designated as curve adjustment or compensation calculation. In this way, certain parameters of a determined curve function can be calculated which correlate with the content of the at least one plant substance. If required, the curve function, e.g. a certain polynomial, can be specified. However, it is also possible to determine which curve function can be most precisely adapted to the response function. The information about the corresponding curve function and the corresponding parameters can then correlate with the content of the at least one plant substance. In this case, the method for minimizing the error value deviation, minimizing the error-square deviation and higher powers, and minimizing the difference between the individual values, which are known per se, can be used.

If response functions Bx are recorded for different concentrations (c) of all relevant plant substances X, and namely independently of each other if possible, the concentration dependency of the response functions for the plant substances can be determined. These can then be stored in a library so that they can be used as the basis of a curve function for the curve fitting, since the recorded response function can potentially be regarded as an overlap of response functions from the individual plant substances. The curve function could then have the following form to which the measured response function $M(\lambda)$ can be approximated:

$$B_{Reference}(\lambda)=a(c)*BI(\lambda)+b(c)*BII(\lambda)+c(c)*BIII(\lambda)+d(c)*BIV(\lambda)+ \ldots +n(c)*Bx(\lambda)$$

In this case, the following relationship may apply to the dependence on the concentration c of the plant substance X of the response functions Bx of the respective plant substances X:

$$Bx(\lambda,c)=n(c)*Bx(\lambda) \text{ with } n=px \text{ (c)}$$

The response functions of the plant substances for the library could in particular be determined separately on the basis of a so-called artificial leaf reproduced in the laboratory as a function of the wavelength of the irradiation. The artificial leaf could have an artificial epidermis layer and an artificial layer of palisade tissue, which can be modelled on the actual layers of a real leaf and in each case have predetermined concentrations of chlorophyll in the artificial layer of palisade tissue and the corresponding secondary plant substance in the artificial epidermis layer. It must be noted in this case that different plants and different leaves of a plant can differ in terms of their leaf structure, such that only limited conclusions can be drawn from one type of leaf about another type of leaf or from one plant about another plant.

Alternatively or additionally, a frequency spectrum, which can be used for a comparison, can be determined by means of a Fourier Transformation, in particular Fast Fourier Transformation (FFT), on the basis of the frequencies recorded over the time of the irradiation with different wavelengths and/or wavelength ranges. In this case, the Fourier Transformation is not carried out on a time-dependent signal, but on a wavelength-dependent signal, in particular on such a response function. Alternatively or additionally, a curve discussion can also be carried out and evaluated on the basis of the response function. Conclusions about the content of the at least one plant substance can then be drawn on the basis of maxima, minima, inflection points, gradients and/or curvatures, in particular in certain regions of the response function. It is also conceivable that integrals and/or partial integrals of the response functions enable conclusions to be drawn about the content of the at least one plant substance.

Chlorophyll fluorescence can also be recorded in a location-dependent or location-resolved manner, so that different points of a leaf, different points of a plant and/or different plants can be observed and evaluated separately at the different wavelengths and/or wavelength ranges of the irradiation. Consequently, in response to the irradiation of the at least one part of the plant with light of each wavelength and/or at each wavelength range, the chlorophyll fluorescence of at least substantially the same wavelength and/or at least substantially the same wavelength range can be measured in each case at different locations of the at least one part of the plant. In this way, it is possible to avoid local differences overlapping each other and leading to an inaccurate determination of the content or concentration of the at least one plant substance. Alternatively or additionally, the content or the concentration of the at least one plant substance can be targetedly examined at certain points of a leaf, different points of a plant and/or different plants. In this case, it is advisable for a location-resolved recording of the chlorophyll fluorescence if the chlorophyll fluorescence is recorded by means of a corresponding sensor, preferably a camera, in particular an IR camera and/or a hyperspectral camera. In the latter cases, the chlorophyll fluorescence can be measured separately at different pixels and/or pixel ranges of the images recorded by the camera.

In this context, it is advisable if the measured values of the chlorophyll fluorescence are compared separately with each other and/or with reference values for each location, in particular for each pixel and/or each pixel range. In this case, the comparison tends to be all the more meaningful if corresponding values of the chlorophyll fluorescence are compared with the reference values as a function of the wavelengths and/or wavelength ranges used for the irradiation. In this way, a location-dependent recording of the content of the at least one plant substance can be achieved. Alternatively or additionally, from the measured values of the chlorophyll fluorescence for each location, in particular for each pixel and/or each pixel range, response functions can be recorded separately as a function of the wavelengths and/or wavelength ranges used for the irradiation. These response functions can then be evaluated particularly expediently, in particular using known mathematical methods. In this case, the evaluation can be carried out for example and in a simple manner in that the respective response functions assigned to the individual locations, in particular pixels, are evaluated by a comparison with reference response functions, by a curve fitting or by a curve adjustment or compensation calculation and/or by a curve discussion. In particular, the advantages already indicated in this context are achieved.

It is particularly expedient for the production of suitable plants if the content of the at least one plant substance of at least one part of a leaf of a plant, of a leaf of a plant, of a plurality of leaves of a plant, of all leaves of a plant, of an entire plant, of at least parts of a plurality of plants or of a plurality of plants is determined as a whole. In this context, the corresponding region of the at least one plant should be irradiated with the different wavelengths and/or wavelength ranges and the chlorophyll fluorescence of the corresponding regions measured. Consequently, it can be provided that at least one part of a leaf of a plant, a leaf of a plant, a plurality of leaves of a plant, all leaves of a plant, an entire plant, at least parts of a plurality of plants or a plurality of plants are irradiated with light of different wavelengths and/or wavelength ranges and that the chlorophyll fluorescence of a certain wavelength and/or a certain wavelength range of the at least one part of a leaf of a plant, of a leaf of a plant, of a plurality of leaves of a plant, of all leaves of a plant, of an entire plant, of at least parts of a plurality of plants or of a plurality of plants is measured.

If required, the chlorophyll fluorescence can be recorded by means of a camera and the images of the camera or certain pixels or pixel ranges of the images of the camera can be converted or recalculated into grey-scale values. The corresponding grey-scale values can then be assigned values of the chlorophyll fluorescence. In particular, the assigned grey-scale values can, to this end, be determined in advance for certain known values of the chlorophyll fluorescence in order to be able to draw conclusions later about specific chlorophyll fluorescences from recorded grey-scale values.

It is particularly expedient to examine living plants or parts of living plants using the corresponding method, wherein the corresponding parts are also not separated from the plant or otherwise permanently and irreversibly disturbed. In other words, the at least one plant substance of at least one part of a plant is determined in-vivo. Therefore, the biomass to be harvested in the future will not be reduced, or at least not significantly, by a large number of examinations of the aforementioned type. Furthermore, it may be expedient not to determine or not only to determine the content of the at least one plant substance, but to determine a concentration of the at least one plant substance in the plant and/or in a certain part of the plant. In most cases, the concentration cannot be increased above a certain maximum, which is important for the harvesting of the plants.

In order to improve the determination of the content and/or the concentration of the at least one plant substance, the at least one part of the plant can be irradiated successively with pulsed light of different wavelengths and/or wavelength ranges. The values of the chlorophyll fluorescence obtained in this way are then more reproducible. Furthermore, the chlorophyll fluorescence can optionally take place in transmission and/or reflection in relation to the irradiation of the at least one part of the plant. However, the arrangement of the at least one radiation source and of the at least one sensor above the at least one plant is usually simpler. This is also less likely to lead to undesirable shadowing effects. Consequently, in many cases the recording of chlorophyll fluorescence in reflection will be preferred.

In the case of a first particularly preferred configuration of the method for optimizing the content of at least one plant substance of at least one plant at the time of harvesting the at least one plant, the harvest time is selected according to the determined content of the at least one plant substance of the at least one part of the at least one plant. If the corresponding content of the plant substance is unsatisfactory, the harvest will take place later and, if required, an attempt is made in the meantime to increase the content of the at least one plant substance, for which the growth conditions can be adjusted if required. Plant growth conditions can be moisture, light intensity, light wavelength range, temperature, $CO_2$ content of the air, nutrient supply and day-night cycle.

Alternatively or additionally, however, at least one growth condition of the at least one plant can also be controlled, in particular regulated, according to predefined criteria on the basis of the determined content of the at least one plant substance of the plant. In this way, the content of the at least one plant substance can be targetedly increased. This can take place, for example, at certain suitable growth phases of the plants or shortly before harvesting. For example, on the one hand, strong growth of the plant can be achieved through suitable growth conditions and, on the other hand, the production of the secondary plant substances can be stimulated at certain points in time. These objectives are usually counteractive because strong growth in size usually occurs with low stress on the plants, while the production of certain secondary plant substances is stimulated by stress on the plant.

BRIEF DESCRIPTION OF THE DRAWINGS

The invention is explained in greater detail below by means of a drawing merely depicting exemplary embodiments. The drawing shows:

FIG. 1 a method according to the invention in a schematic representation,

DESCRIPTION OF THE INVENTION

Figure 2A:
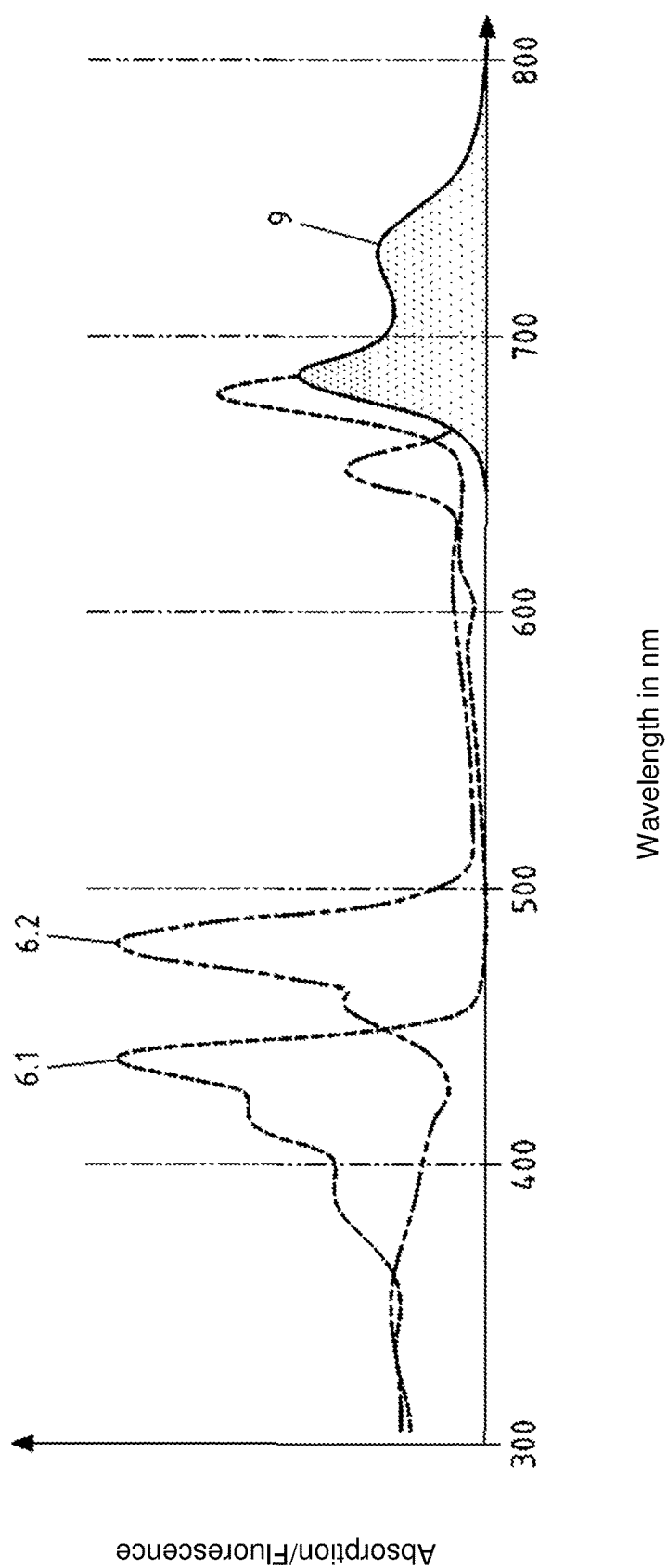
FIG. 2A-B the absorption ability of chlorophyll and the chlorophyll fluorescence as a function of the wavelength, FIG. 3 the chlorophyll fluorescence of a leaf recorded using the method according to FIG. 1 as a function of the wavelength of the excitation radiation, FIG. 4A-B alternative configurations of the method represented in principle in FIG. 1 and FIG. 5 exemplary spectra of the chlorophyll fluorescence.

A method for determining the content of at least one plant substance 1 of a leaf 2 of a plant 3 is schematically represented in FIG. 1. The leaf 2 has a layer designated as epidermis 4 close to the surface, which contains, among other things, secondary plant substances 1. Below this epidermis 4, the leaf 2 has a layer designated as palisade tissue 5, which contains chlorophyll 6, here the two types of chlorophyll a and chlorophyll b. The corresponding leaf 2 is irradiated successively with radiation 7, the excitation radiation, in the form of light of different wavelengths $\lambda_1$-$\lambda_4$, for which purpose different radiation sources 8 in the form of LEDs are used in the method represented and preferred in this respect. The light or excitation radiation 7 is partially absorbed by secondary plant substances 1 on its way into the palisade tissue 5 of the leaf 2 in the epidermis 4 of leaf 2. This part of the radiation 7 absorbed in the epidermis 4 and possibly reflected does not therefore reach the palisade tissue 5 and the chlorophyll 6 in the leaf. The remaining part of the radiation 7 is in turn partially absorbed in the palisade tissue 5. Chlorophyll 6 cannot, however, use all the radiation energy for photosynthesis and emits part of the absorbed radiation energy in the form of so-called chlorophyll fluorescence 9 (ChlF). The intensity of the chlorophyll fluorescence 9 thereby depends on the radiation intensity, which is also designated as the radiation strength, and on the wavelength k of the excitation radiation 7.

Chlorophyll fluorescence 9 is recorded for each of the excitation irradiations 7 by means of a sensor 10 and in the present case in reflection, i.e. from the same side of leaf 2 from which the leaf 2 was irradiated with the excitation irradiation 7. The sensor 10 for recording the chlorophyll fluorescence 9 is in the represented exemplary embodiment an IR camera (infrared camera). The sensor 10 records radiation in the infrared wavelength range. Value pairs of chlorophyll fluorescence 9 and excitation radiation 7 are then formed, which are used for further evaluation.

The intensity of the chlorophyll fluorescence 9 recorded by the sensor 10 is generally greater the more radiation is absorbed by the chlorophyll 6. For this reason, the chlorophyll fluorescence 9 tends to decrease when more radiation is absorbed in the epidermis 4 and when the radiation intensity of the excitation radiation 7 is reduced. In this case, the proportion of absorbed radiation 7 fundamentally decreases with the content of the plant substances 1 at least partially absorbing the radiation 7 of the respective wavelength k. Since the content of the plant substances 1 remains constant during the measurement on a part of a plant 3, such as on a leaf 2 of the plant 3, but the plant substances 1 absorb the radiation 7 of the different radiation sources 8 to varying degrees in the different wavelength ranges, a characteristic response function 11 to the irradiation can be obtained in the described manner as the wavelength dependency of the chlorophyll fluorescence 9. The different radiation intensity of the radiation 7 as a result of different absorption and varying degrees of chlorophyll fluorescence 9 is illustrated in FIG. 1 by the different line thicknesses of the arrows marking the corresponding excitation radiations 7 and the chlorophyll fluorescence 9.

Figure 2B:
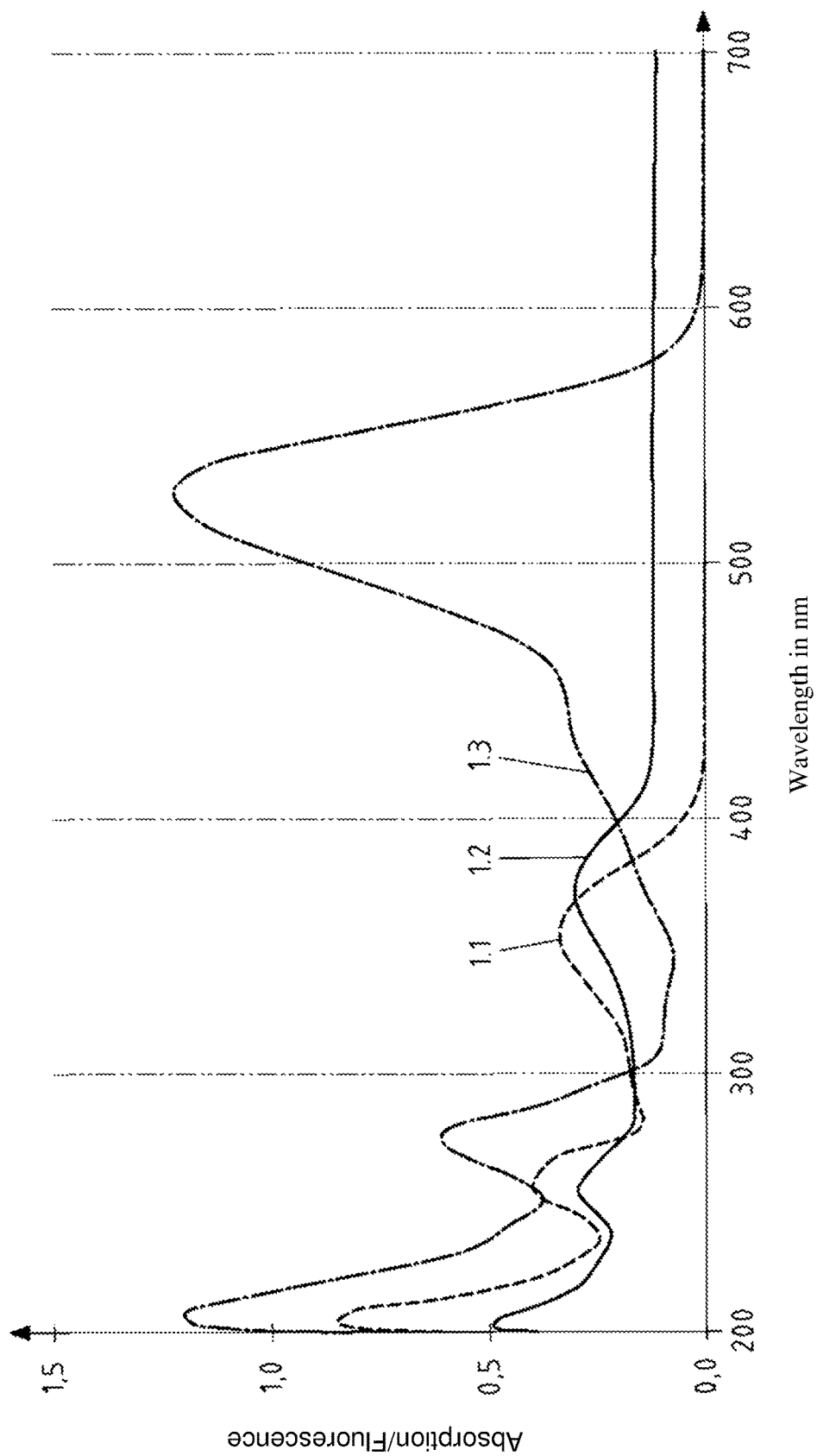

The wavelength-dependent absorption of chlorophyll a 6.1 and chlorophyll b 6.2 as well as the wavelength-dependent chlorophyll fluorescence 9 is represented in FIG. 2A. The chlorophyll fluorescence 9 comprises wavelengths greater than 650 nm, while the absolute absorption maxima are in the range between 400 nm and 500 nm. The wavelength-dependent absorption of exemplary secondary plant substances 1.1-1.3 is, on the other hand, represented in FIG. 2B, which each have different local absorption maxima. Consequently, the chlorophyll fluorescence 9 is highly dependent on the excitation wavelength $\lambda$ and the composition of the examined leaf, in particular on the contents or concentrations of the secondary plant substances 1.

Figure 3:
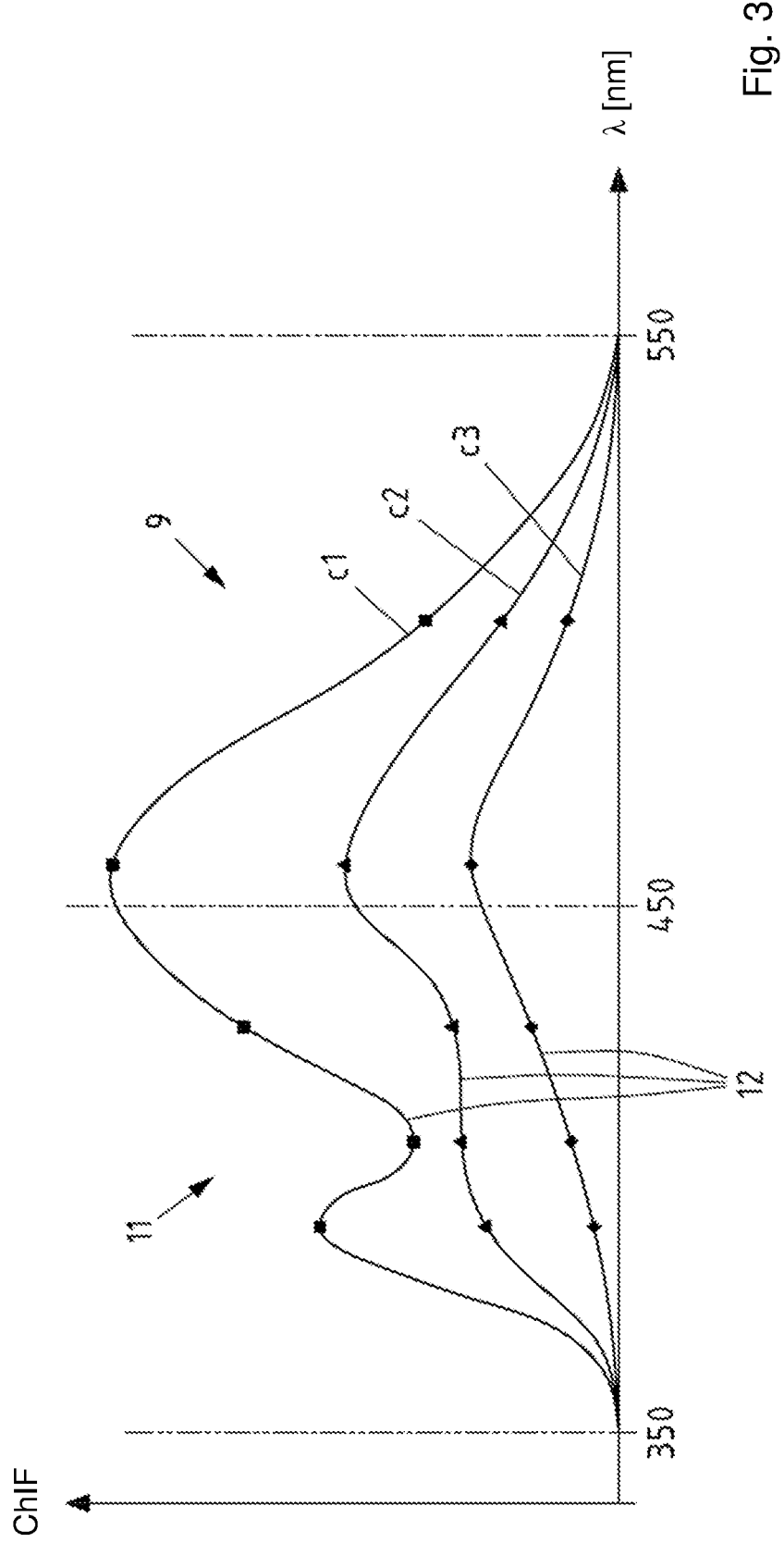

Response functions 11 over the wavelength X of the excitation radiation 7 are represented by way of example in FIG. 3, which were recorded using the previously described method for different concentrations c1-c3 of a certain plant substance 1 in the epidermis 4 of an artificially modelled leaf. The absolute values of the chlorophyll fluorescence 9 are thereby not only lower with increasing concentration, the shape of the response function 11 also varies to a certain extent with the concentration of the plant substance 1. For this reason, the corresponding response function 11, in particular after standardizing to the same radiation intensity, can be compared with response functions from a library for known concentrations of the plant substances 1. In this case, it may be advisable not to compare the recorded response function 11 of the chlorophyll fluorescence 9 itself, but rather to compare a function 12 approximated or adapted to the recorded response function 1, if necessary, standardized in particular to the radiation intensity, with the functions of a library. In particular, a comparison of certain parameters of the corresponding functions, for example in the form of polynomials, is also considered here. The response functions 11 stored in the library may also have been recorded on artificially modelled leaves, because this makes it easy to adjust different compositions, in particular of the secondary plant substances 1. The response functions 11 can alternatively or additionally also be determined on real leaves 2 and the composition of the examined leaves 2 can be analyzed in a conventional manner. Thus, if necessary, more realistic response functions 11 can be obtained and/or the response functions 11 determined on artificial leaves can be at least partially verified.

However, it can also be provided that at least one characteristic value of the response function 11 is determined, also as required after a standardization of the response function 11. This can for example be a slope of the response function 11 in a certain wavelength range and/or the ratio of certain local maxima of the response function 11. Such a characteristic parameter could also be an integral or partial integral in a certain wavelength range. Furthermore, it is conceivable that it is expedient to determine different characteristic values for the determination of different plant substances 1 or to compare them with corresponding values of a library.

Figure 4A:
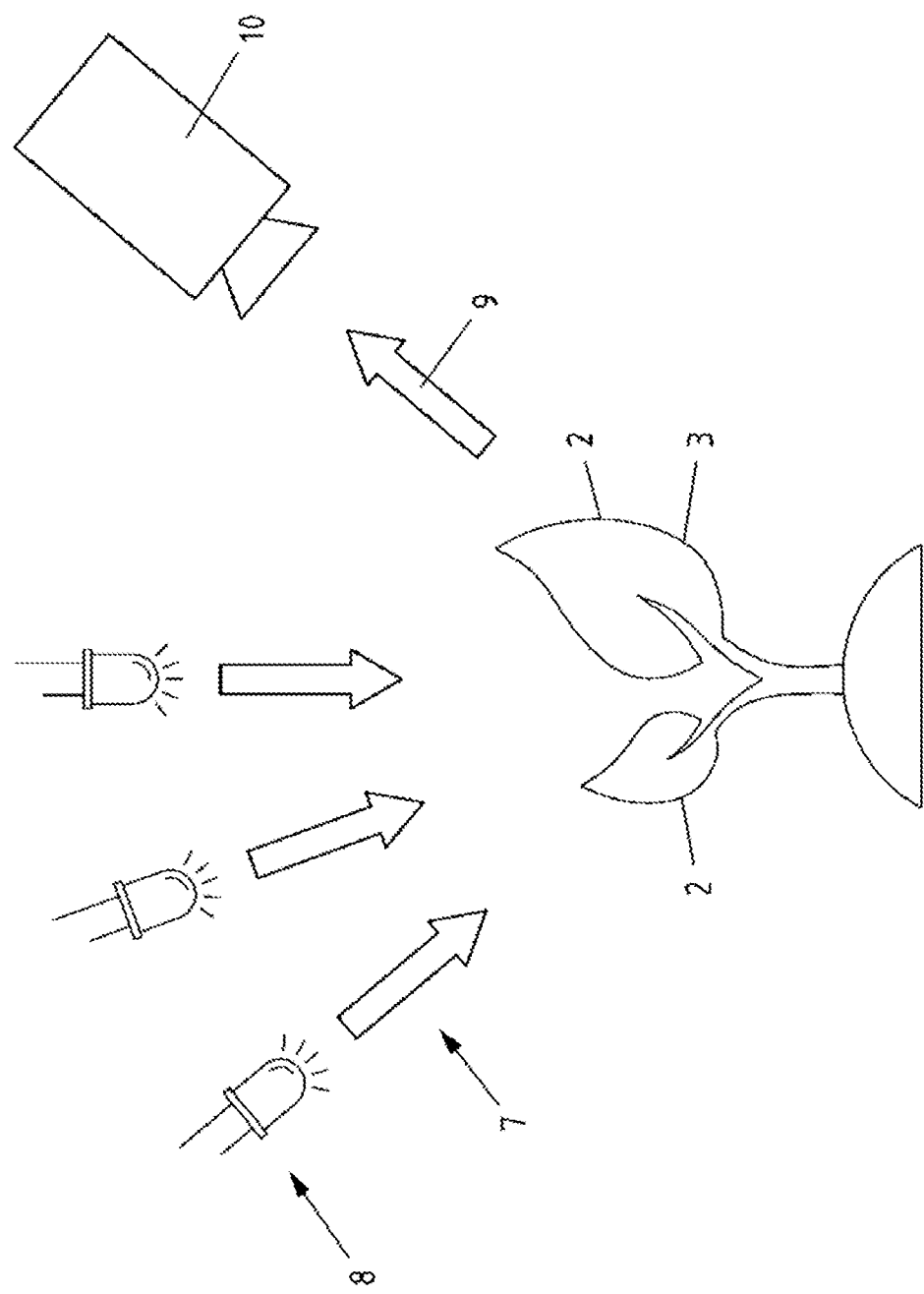
Figure 4B:
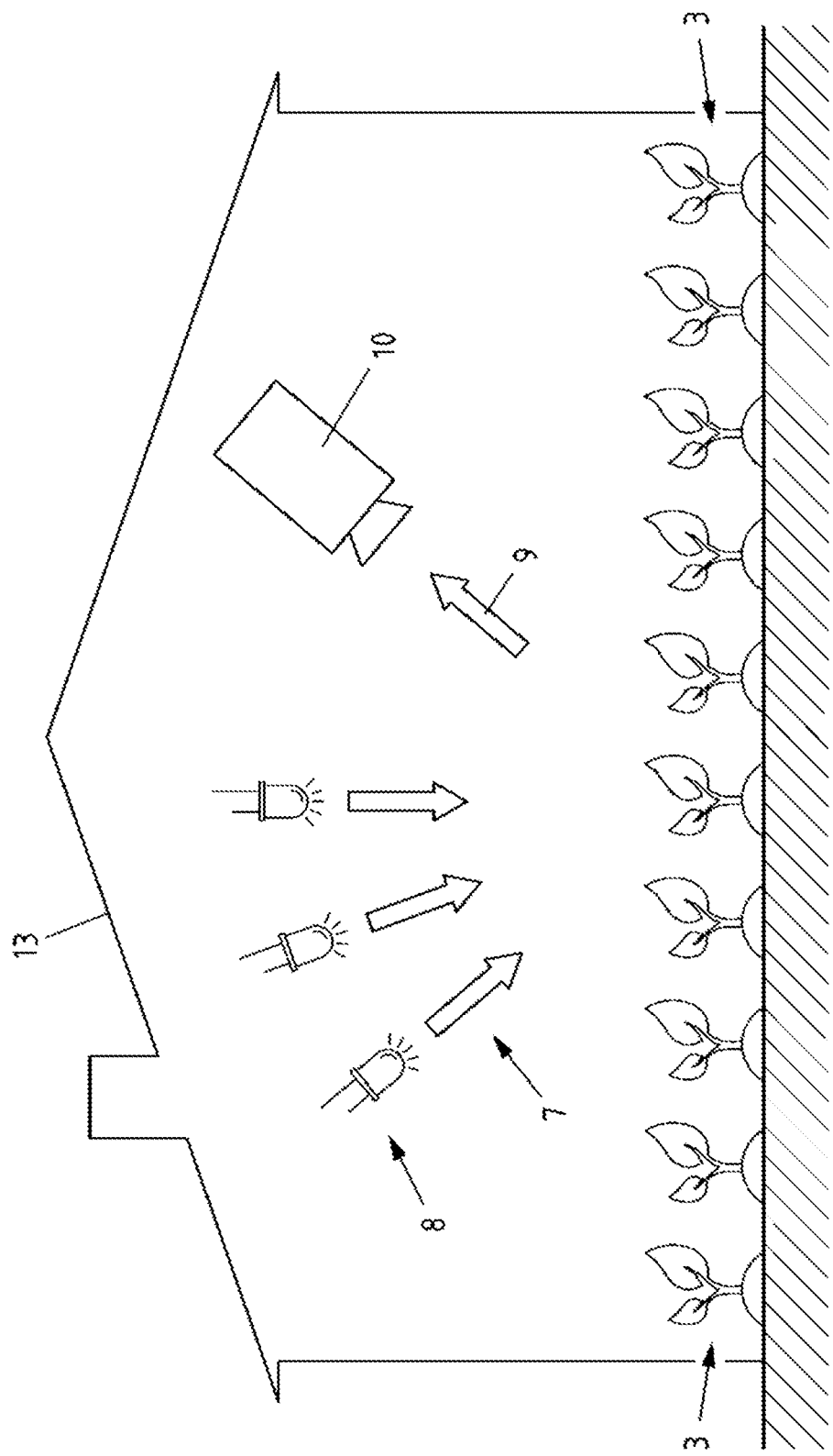

FIG. 4A-B relate to alternative configurations of the method represented in principle in FIG. 1. In this case, according to the schematic representation of FIG. 4A, not only is a single leaf 2 or a certain section of a leaf 2 irradiated to generate a characteristic chlorophyll fluorescence 9 with different excitation wavelengths 7, but rather the entire plant 3 is irradiated. In this case, the direction of the irradiation and the direction from which the chlorophyll fluorescence 9 is recorded are preferably predefined in order to examine the same plant 3 at different points in time using the corresponding method with regard to the content of at least one plant substance 1. Since the composition of the plant substances 1 can differ significantly from leaf 2 to leaf 2 on a plant 3, in order to increase the significance and/or to avoid many individual measurements on many individual leaves 2, it may be advisable to examine the entire plant 3 at the same time. If certain plant types are planted in large numbers over a large area, it may also be advisable to examine a whole group of plants 3 together. This is schematically represented in FIG. 4B. This takes into account the fact that the contents of certain plant substances 1 can vary greatly from location to location. For the sake of simplicity and reproducibility, it is advisable to examine together an, in particular large, group of plants 3, in particular in a greenhouse 13.

Figure 5:
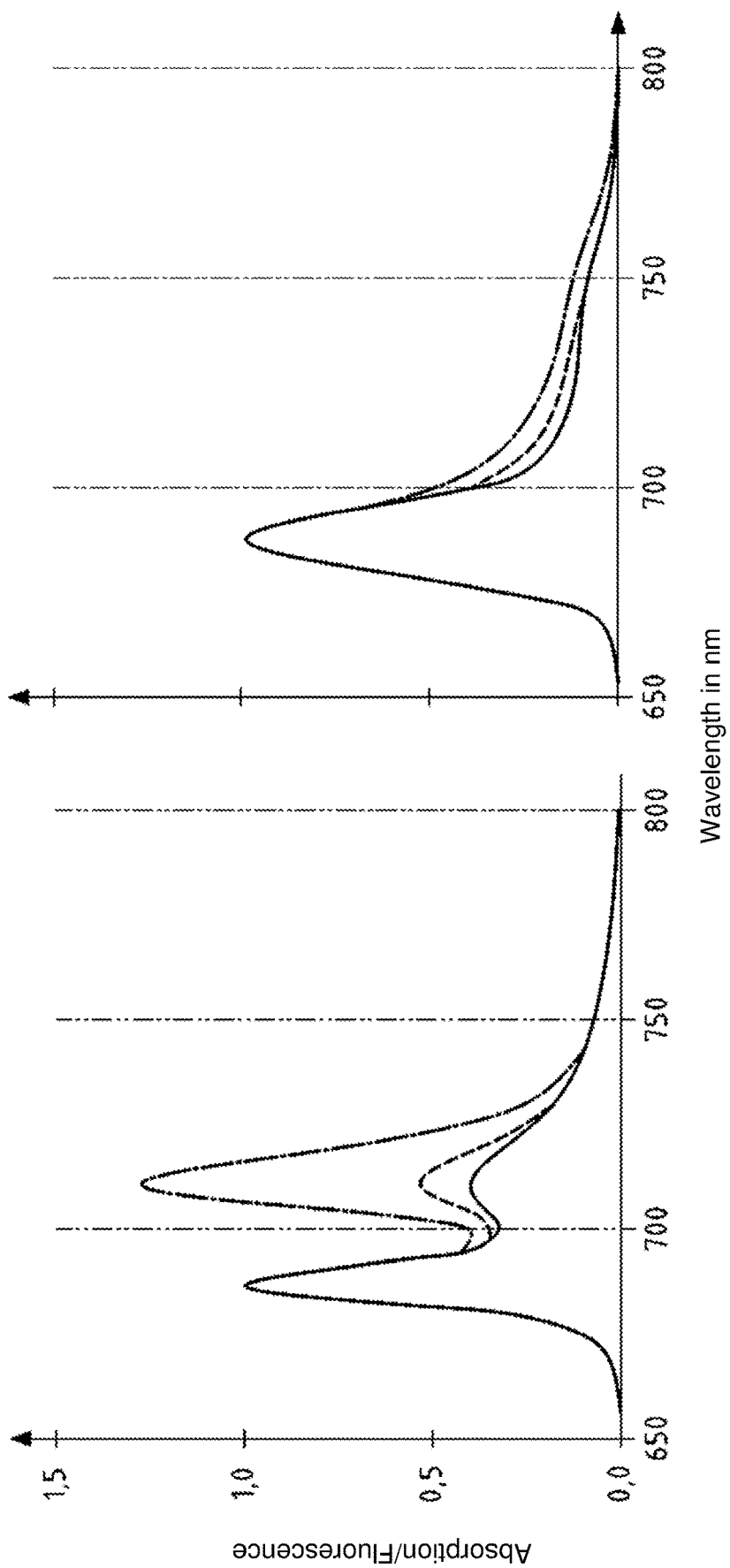

Exemplary spectra of the chlorophyll fluorescence are represented by way of example in FIG. 5.

LIST OF REFERENCE NUMERALS

1 Plant substance
2 Leaf
3 Plant
4 Epidermis
5 Palisade tissue
6 Chlorophyll
7 Excitation wavelength
8 Radiation source
9 Chlorophyll fluorescence
10 Sensor
11 Response function
12 Function
13 Greenhouse

The invention claimed is:

1. A method for determining the content of at least one plant substance of at least one part of a plant, comprising:
successively irradiating the at least one part of the plant with light of different wavelengths and/or wavelength ranges and
in response to irradiating the at least one part of the plant with light of each wavelength and/or at each wavelength range, measuring the chlorophyll fluorescence of at least the same wavelength and/or at least the same wavelength range in each case.

2. The method according to claim 1, further comprising:
comparing the measured values of the chlorophyll fluorescence with one another and/or with reference values.

3. The method according to claim 1, further comprising:
successively irradiating the at least one part of the plant with light of at least three different wavelengths and/or wavelength ranges and
in response to irradiating the at least one part of the plant with light of the at least three different wavelengths and/or wavelength ranges, measuring the chlorophyll fluorescence of at least the same wavelength and/or at least the same wavelength range in each case.

4. The method according to claim 1, further comprising:
selecting at least one of the different wavelengths and/or wavelength ranges at least in the range of an absorption maxima of at least one plant substance.

5. The method according to claim 1, further comprising:
selecting at least one of the different wavelengths and/or wavelength ranges at least in the range of an absorption maxima of a chlorophyll.

6. The method according to claim 1, further comprising:
from the measured values of the chlorophyll fluorescence, recording a response function as a function of the wavelengths and/or wavelength ranges used for irradiating the at least one part of the plant.

7. The method according to claim 1, further comprising:
in response to irradiating the at least one part of the plant with light of each wavelength and/or at each wavelength range, measuring the chlorophyll fluorescence of at least the same wavelength and/or at least the same wavelength range in each case at different locations of the at least one part of the plant.

8. The method according to claim 7, further comprising:
separately comparing the measured values of the chlorophyll fluorescence for each location with one another and/or with reference values and/or
from the measured values of the chlorophyll fluorescence for each location, separately recording response functions as a function of the wavelengths and/or wavelength ranges used for irradiating the at least one part of the plant.

9. The method according to claim 1, further comprising:
determining the at least one plant substance of at least one part of a leaf of a plant, of a leaf of a plant, of a plurality of leaves of a plant, of all leaves of a plant, of an entire plant, of at least parts of a plurality of plants or of a plurality of plants in total, irradiating at least one part of a leaf of a plant, a leaf of a plant, a plurality of leaves of a plant, all leaves of a plant, an entire plant, at least parts of a plurality of plants or a plurality of plants with light of different wavelengths and/or wavelength ranges, and measuring the chlorophyll fluorescence of a certain wavelength and/or of a certain wavelength range of the at least one part of a leaf of a plant, of a leaf of a plant, of a plurality of leaves of a plant, of all leaves of a plant, of an entire plant, of at least parts of a plurality of plants or of a plurality of plants.

10. The method according to claim 1, further comprising:
determining the values of the chlorophyll fluorescence from grey-scale values of images and/or pixels recorded by means of a camera.

11. The method according to claim 1, further comprising:
determining the at least one plant substance of at least one part of a plant in-vivo and/or
determining a concentration of the at least one plant substance.

12. The method according to claim 1, further comprising:
successively irradiating the at least one part of the plant with pulsed light of different wavelengths and/or wavelength ranges and/or
measuring the chlorophyll fluorescence in transmission and/or reflection in relation to the irradiation of the at least one part of the plant.

13. A method for optimizing the content of at least one plant substance of at least one plant at the time of harvesting the at least one plant, comprising:
determining the content of the at least one plant substance of at least one part of the at least one plant using the method according to claim 1; and
selecting the time of harvest according to the determined content of the at least one plant substance of the at least one part of the at least one plant.

14. A method for optimizing the content of at least one plant substance of at least one plant at the time of harvesting the at least one plant, comprising:
determining the content of the at least one plant substance of at least one part of the at least one plant using the method according to claim 1; and
controlling at least one growth condition of the at least one plant according to predefined criteria on the basis of the determined content of the at least one plant substance of the plant.

15. A method for optimizing the content of at least one plant substance of at least one plant at the time of harvesting the at least one plant, comprising:
determining the content of the at least one plant substance of at least one part of the at least one plant using the method according to claim 1; and
regulating at least one growth condition of the at least one plant according to predefined criteria on the basis of the determined content of the at least one plant substance of the plant.

* * * * *